United States Patent
Roehl et al.

[11] 3,725,913
[45] Apr. 3, 1973

[54] MICROWAVE SENSITIVITY TIME CONTROL CIRCUIT

[75] Inventors: Ernest R. Roehl, Anaheim; Gerald D. Carey, Fullerton, both of Calif.

[73] Assignee: The United States of America as represented by the Secretary of the Air Force

[22] Filed: Nov. 22, 1971

[21] Appl. No.: 200,719

[52] U.S. Cl. ............................... 343/5 SM, 343/13 R
[51] Int. Cl. .................................................. G01s 7/34
[58] Field of Search .................... 343/5 SM, 5 R, 13 R

[56] References Cited

UNITED STATES PATENTS

| | | | |
|---|---|---|---|
| 2,798,949 | 7/1957 | Scholz | 343/5 SM |
| 3,095,565 | 6/1963 | Scheusch | 343/13 R |
| 3,305,859 | 2/1967 | Schwartz | 343/5 SM |
| 3,366,955 | 1/1968 | Mattern | 343/13 R |
| 3,659,290 | 4/1972 | Bourque | 343/5 SM |

*Primary Examiner*—Benjamin A. Borchelt
*Assistant Examiner*—G. E. Montone
*Attorney*—Harry A. Herbert, Jr.

[57] ABSTRACT

A microwave sensitivity control (STC) circuit for use with a radar receiver is provided in which the STC control element is included as a part of a microwave mixer. STC control diodes are located aft of the microwave mixer diode. The receiver is operated with STC not applied until the target return is sufficiently large to cause the transfer function of the mixer-IF preamplifier to just begin compressing. At this time control bias is applied to the STC diodes which reduces the electric field intensity at the plane of the mixer diode by 25 db as the target returns become larger.

2 Claims, 9 Drawing Figures

INVENTOR.
ERNEST R. ROEHL
GERALD D. CAREY
BY Harry A. Herbert Jr.
George Fine and
ATTORNEYS

MICROWAVE SENSITIVITY TIME CONTROL CIRCUIT

BACKGROUND OF THE INVENTION

The present invention relates to sensitivity time control circuits, and more particularly to a circuit for extended sensitivity and dynamic range.

Sensitivity time control of return signals is used in radar receivers that require a large dynamic range. This results in the preservation of the target information that is present at the antenna terminals for high level target returns as well as for low level returns. There are several requirements for the STC elements. One requirement is minimum residual loss so that inclusion of the STC should provide a minimum amount of receiver sensitivity degradation. Another requirement is linear operation for large target returns so that the receiver, and particularly the input stages (mixer and IF preamplifiers), should be controlled so that operation in a linear range is maintained for high level targets. Yet another requirement is an STC control range of 20 to 25 db, this range allowing the receiver to handle received targets that approach a one milliwatt power level.

The STC circuit of the present invention includes the STC control elements as a part of the microwave mixer. The STC control diodes are located aft of the microwave mixer. This unique microwave STC circuit provides extended receiver sensitivity due to the low loss of the STC control elements. The extremely low loss that is present when low level targets are received will be called residual STC loss which provides a receiver sensitivity that is very nearly as good as if the STC function were not used. The dynamic range of the receiver is extended by 25 db at the high level end of the dynamic range. This is achieved by reducing the electric field intensity at the plane of the mixer diodes when STC is applied. This 25 db dynamic range extension can be briefly described as a function of increasing signal level. The receiver is operated with STC not applied until the target return is sufficiently large to cause the transfer function of the mixer-IF preamplifier to just begin compressing. At this time control bias is applied to the STC diodes located aft of the mixer diode. The bias applied to the STC diodes reduces the electric field intensity at the plane of the mixer diode by 25 db as the target returns become larger. This is accomplished by using a varactor phase shifter to gradually change the effective phase length between the mixer diode and the RF short from a quarter wavelength to a half wavelength. The extension of the dynamic range to the vicinity of one milliwatt received target returns is described in the following paragraph.

A low noise mixer-IF preamplifier will usually operate with a constant transfer function until the target returns have increased to minus 30 dbm into the microwave mixer. As the target returns increase above this level, the IF preamplifier gain begins compressing. Application of the microwave STC maintains the signal level at the plane of the mixer diode at minus 30 dbm as the target return increases another 25 db to minus 5 dbm. Likewise, the microwave STC achieved an extension to the receiver dynamic range when IF STC is applied to the preamplifier. A low noise mixer-IF preamplifier with IF STC will usually operate with a constant transfer function until the target returns have increased to minus 20 dbm into the microwave mixer. Application of the microwave STC extends the dynamic range to plus 5 dbm for this case.

SUMMARY OF THE INVENTION

A microwave sensitivity time control circuit for extended sensitivity and dynamic range is provided. The circuit comprises three diodes connected in a predetermined phase sequence between an RF line and ground. The RF line has an input at one end and a fixed RF short at the other end. The first diode is connected at the input of the RF line and is the microwave mixing element in which the RF input signals are heterodyned. An intermediate frequency amplifier is connected directly to the output of this diode. The second diode is connected to the RF line at a first predetermined phase distance from the first diode and is utilized to provide a very low loss short circuit for long range low level signal returns and a high impedance for near range signals. In the case of high impedance, the RF energy can flow freely past the second diode in either forward or reverse direction. The third diode is a varactor and is placed closely adjacent to the fixed RF short. The phase distance between the first and second diode is 90° and the second diode and the fixed RF short is 180°. The second and third diodes receive first and second predetermined bias voltages respectively. With reverse bias to the second diode for long range targets, it presents a low loss short circuit and with forward bias for near range targets, it acts as a high resistance shunting the RF line. In this case RF energy can flow freely past the second diode in either the forward or reverse direction. For maximum bias to the third diode (varactor), the capacitance is minimum. Thus the radar receiver may be operated with STC not applied until the target return is sufficiently large to cause the transfer function of the mixer-IF preamplifier to just begin to compress. At this time control bias is applied to the STC diodes located aft of the mixer diode. The bias applied to the STC diodes reduces the electric field intensity at the plane of the mixer diode by 25 db as the target return becomes larger. This is accomplished by using the varactor phase shifter to gradually change the effective phase length between the mixer diodes and the RF short from a quarter wavelength to a half wavelength.

An object of this invention is to provide a microwave sensitivity time control circuit for extended sensitivity and dynamic range in which the STC control elements are part of a microwave mixer.

DETAILED DESCRIPTION OF THE PREFERRED EMBODIMENT

Figure 1:
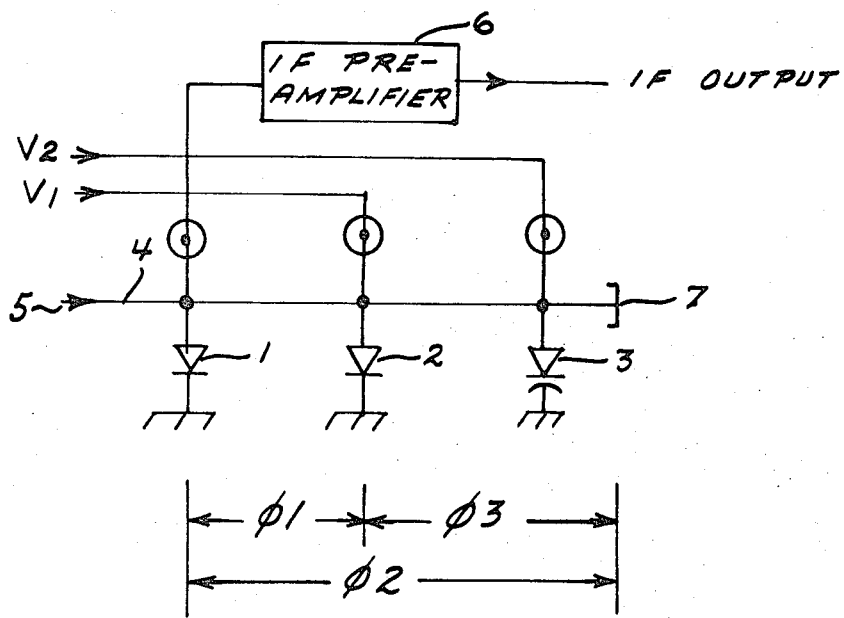
FIG. 1 shows a schematic diagram of the preferred embodiment of the invention.
Figure 2:
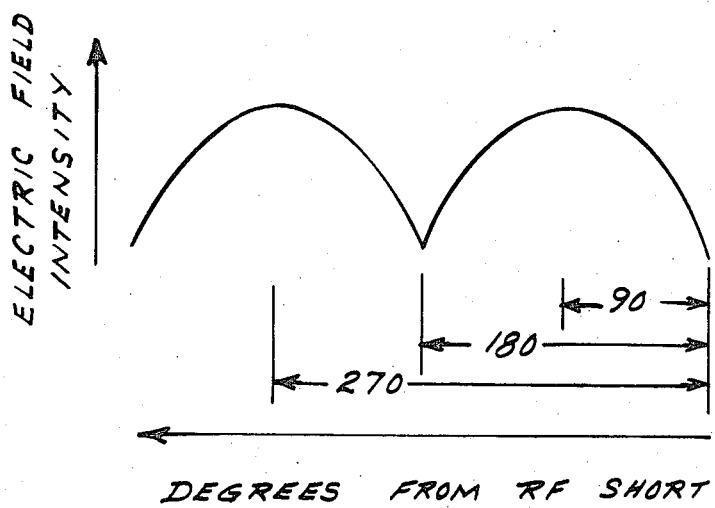
FIG. 2 illustrates the electric field intensity as a function of RF phase angle between mixer diode and RF short circuit.
Figure 3:
FIG. 3 shows the RF transmitted signals against time.
Figure 4:
FIG. 4 illustrates the envelope of maximum target return against time (range) with arrows indicating the position of the −20 dbm to −30 dbm received target signal.
Figure 5:
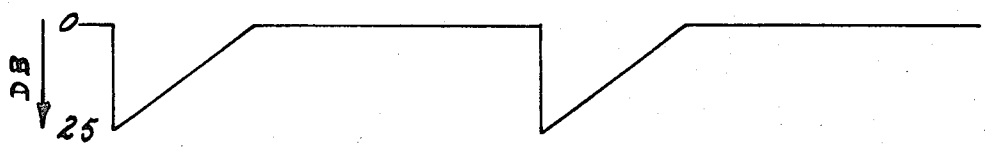
FIG. 5 illustrates STC attenuation against time (range)
Figure 6:
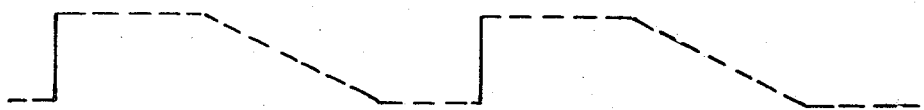
FIG. 6 shows the signal level at the mixer diode with STC applied.
Figure 7:
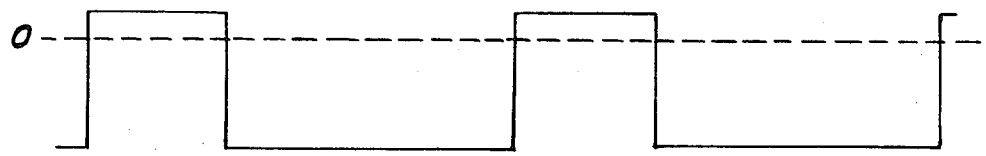
FIG. 7 illustrates the bias (V1) to the second diode (diode 2) against range.
Figure 8:
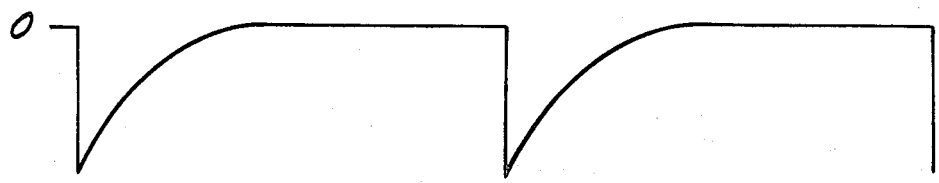
FIG. 8 illustrates the bias (V2) to the third diode (diode 3) against range.
Figure 9:
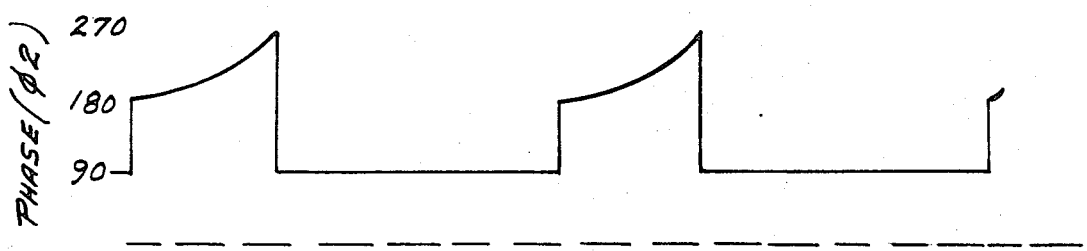
FIG. 9 shows the RF phase length ($\theta2$) between the mixer diode (diode 1) and the RF short circuit aft of the diode against range.

Now referring in detail to FIG. 1, the mixing element in which the RF input signals are heterodyned is diode 1. Diode 1 is connected between the input to RF line 4 and ground. RF line 4 receives radar target return signal at terminal 5. Diode 1 can be either a point contact or Schttky barrier mixer diode. VHF intermediate frequency amplifier 6 is connected directly to the output of diode 1. The purpose of diode 2 is to provide a very low loss short circuit at an RF phase distance ($\phi1$ of FIG. 1) of 90° from mixer diode 1 for long range low level signal returns. Diode 2 is connected between RF line 4 and ground. A diode with good conductivity (i.e. low bulk resistance compared to the characteristic impedance of the RF line) dissipates only about 0.1 db of RF signal in the diode. This short circuit loss is nearly as low as would be obtained if a metal plate were located 90° aft of the mixer diode. The electric field intensity at mixer diode 1 is shown by the 90° phase position of FIG. 2. The bias waveform V1 to diode 2 is shown in FIG. 7. With reverse bias (for long range targets) to the diode, the diode presents a low loss short circuit. With forward bias (for near range targets) to the diode, the diode acts as a high resistance shunting the RF line. In this case RF energy can flow freely past diode 2 in either the forward or reverse direction. Diode 3 is a varactor diode and receives a bias of V2 as shown in FIG. 8. For maximum bias of FIG. 8, the capacitance of diode 3 is minimum. $\phi3$ includes diode 3 and the RF line between diode 2 and fixed RF short. $\phi3$ is 90° for this case. $\phi Z$ is the total phase distance between mixer diode 1 and fixed RF short 7. $\phi2$ is 180° with $\phi3$ equal to 90°. Short 7 and diode 3 are closely adjacent to each other. This is the condition for near range targets. The electric field intensity at mixer diode 1 is a minimum as shown by the 180° phase position of FIG. 2. The magnitude of electric field reduction at mixer diode 1 for this condition is dependent upon how well diodes 3 and 2 are matched to the RF line. A VSWR match of 1.12:1.0 provides 25 db of signal reduction at the plane of the mixer diode. (The 1.12 VSWR is into D2 and D3 with the short replaced by a matched load.) As the target range becomes longer and the target returns become smaller as shown in FIGS. 3 and 4, the magnitude of STC attenuation applied to the microwave mixer decreases as shown in FIG. 5. This tends to limit the maximum signal level applied to the mixer diode to L constant level while the STC is applied as shown in FIG. 6. The increase in signal level at the mixer diode as the STC is reduced can be seen in FIG. 2 as the phase length to the RF short circuit increases from 180° to 270°. FIGS. 8 and 9 show the bias voltage applied to the varactor diode 3 and the resultant RF phase length between the mixer diode and the RF short circuit.

At the expiration of the STC bias of FIG. 8, diode 2 is reverse biased to obtain the very low diode short circuit loss for long range targets.

It is noted that $\phi1$ equals 90° for low level signals, $\phi2$ equals 180° for high level signals (and $\phi1$ $\phi3$ 90°), and $\phi$ increases from 90° to 180° during decay of V2 meanwhile $\phi2$ changes as shown in FIG. 9.

What is claimed is:

1. A microwave sensitivity time control circuit for a microwave radar receiver being fed RF signals representative of radar return signals comprising a fixed RF short, a microwave RF line having first and second ends, said first end being the input for said RF signals representative of said radar returns and said second end having positioned thereat said fixed RF short, first, second and third diodes being connected in sequence between said RF line and ground, said first diode being positioned at said input, said second diode at a first predetermined phase from said first diode, and said third diode positioned closely adjacent to said fixed RF short with said fixed RF short being at a second predetermined phase from said second diode, the position between said first diode and said fixed short being at a third predetermined phase, said third diode being a varactor or diode operating as a phase shifter, said second and third diode receiving first and second predetermined bias voltage waveforms, respectively, and intermediate frequency means receiving an output signal from said first diode.

2. A microwave sensitivity time control circuit as described in claim 1 wherein said first predetermined phase being at 90° for low level RF signals, said third predetermined phase being at 180° for high level RF signals, and said second predetermined phase increasing from 90° to 180° during decay of said second predetermined bias voltage waveform as said third predetermined phase changes.

* * * * *